(12) United States Patent
Fukushima et al.

(10) Patent No.: US 8,445,285 B2
(45) Date of Patent: May 21, 2013

(54) LIQUID FOR EJECTION AND METHOD FOR EJECTING BIO-SPECIMEN

(75) Inventors: Hitoshi Fukushima, Suwa (JP); Yukihiro Hanaoka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 210 days.

(21) Appl. No.: 12/823,605

(22) Filed: Jun. 25, 2010

(65) Prior Publication Data

US 2010/0327008 A1  Dec. 30, 2010

(30) Foreign Application Priority Data

Jun. 29, 2009 (JP) ................................. 2009-153504

(51) Int. Cl.
*G01N 31/00* (2006.01)
(52) U.S. Cl.
USPC ................................. 436/17; 436/8
(58) Field of Classification Search
USPC .................. 436/8, 63, 86, 174, 183
See application file for complete search history.

(56) References Cited

U.S. PATENT DOCUMENTS

| 6,015,716 | A * | 1/2000 | Harmon et al. | 436/501 |
|---|---|---|---|---|
| 7,605,124 | B2 | 10/2009 | Masada et al. | |
| 7,827,982 | B2 | 11/2010 | Masada et al. | |
| 2006/0105468 | A1 * | 5/2006 | Winkler et al. | 436/174 |
| 2007/0202261 | A1 | 8/2007 | Matsushita | |
| 2007/0222842 | A1 | 9/2007 | Masada et al. | |
| 2007/0248571 | A1 | 10/2007 | Masada et al. | |
| 2009/0053174 | A1 | 2/2009 | Kaneko et al. | |
| 2009/0060869 | A1 | 3/2009 | Sugita et al. | |
| 2010/0069290 | A1 | 3/2010 | Masada et al. | |

FOREIGN PATENT DOCUMENTS

| JP | A-2002-249684 | 9/2002 |
|---|---|---|
| JP | A-2006-117632 | 5/2006 |
| JP | A-2006-273794 | 10/2006 |
| JP | A-2006-307099 | 11/2006 |
| JP | A-2007-253611 | 10/2007 |
| JP | A-2007-263589 | 10/2007 |
| JP | A-2008-137967 | 6/2008 |
| JP | A-2009-250946 | 10/2009 |
| WO | WO 2007071377 A1 * | 6/2007 |

OTHER PUBLICATIONS

Wieslander, Ake et al. "Metabolic changes of membrane lipid composition in Acholeplasma laidlawii by hydrocarbons, alcohols, and detergents: Arguments for effects on lipid packing." Biochemistry (1986) 25 7511-7517.*
Machine translation of WO 2007/071377 A1 obtained from Google Translate by the Examiner on Dec. 11, 2012.*

* cited by examiner

*Primary Examiner* — Yelena G Gakh
*Assistant Examiner* — Christopher A Hixson
(74) *Attorney, Agent, or Firm* — Oliff & Berridge, PLC

(57) ABSTRACT

A liquid for ejection includes a bio-specimen, and at least one kind of first compounds expressed by Formula (1),

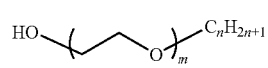

Formula (1)

wherein, in Formula (1), $m \geq 8$, and $8 \leq n \leq 18$.

4 Claims, 3 Drawing Sheets

| Compound | P200 | | P4000 | | P11000 | | PEG12 | | | PEG24 | | | | P1777 | PEG-B-24 | PEG36 | | | |
|---|---|---|---|---|---|---|---|---|---|---|---|---|---|---|---|---|---|---|---|
| Concentration (wt%) | 2 | 3 | 2 | 3 | 2 | 3 | 1 | 2 | 3 | 1 | 2 | 3 | 5 | 2 | 3 | 1 | 2 | 3 | 4 |
| Elapsed time (sec.) | | | | | | | | | | | | | | | | | | | |
| 0 | 12/12 | 12/12 | 12/12 | 12/12 | 12/12 | 12/12 | 12/12 | 12/12 | 12/12 | 12/12 | 12/12 | 12/12 | 12/12 | 12/12 | 12/12 | 12/12 | 12/12 | 12/12 | 12/12 |
| 5 | 1/12 | 2/12 | 2/12 | 2/12 | 0/12 | 0/12 | 3/12 | 12/12 | 12/12 | 9/12 | 12/12 | 12/12 | 12/12 | 12/12 | | 11/12 | 12/12 | 12/12 | 12/12 |
| 10 | | | | | | | | 4/12 | 12/12 | | 11/12 | 12/12 | 12/12 | 12/12 | | | 12/12 | 12/12 | 12/12 |
| 20 | | | | | | | | | | | | | 12/12 | 12/12 | | | | | |
| 30 | | | | | | | | | 10/12 | | 6/12 | 12/12 | 10/12 | | | 11/12 | 12/12 | 12/12 | 12/12 |
| 60 | | | | | | | | | 11/12 | | 2/12 | 12/12 | 10/12 | | | | 12/12 | 12/12 | 12/12 |
| 120 | | | | | | | | | | | | 8/12 | | 12/12 | | | 12/12 | 12/12 | 12/12 |
| 300 | | | | | | | | | 0/12 | | | | | | | | 12/12 | 12/12 | 12/12 |
| 600 | | | | | | | | | | | | | | | | | 12/12 | 12/12 | 12/12 |
| 900 | | | | | | | | | | | | | | | | | 12/12 | 12/12 | 12/12 |
| 1800 | | | | | | | | | | | | | | | | | 12/12 | 12/12 | 12/12 |
| 3600 | | | | | | | | | | | | | | | | | 11/12 | 12/12 | 12/12 |

FIG. 1

| Concentration | Blood serum only | PEG12 Dissolving | PEG12 Head dispensing | PEG24 Dissolving | PEG24 Head dispensing | P1777 Dissolving | P1777 Head dispensing | PEG36 1wt | PEG36 2wt | PEG36 3wt | PEG36 4wt | SF1 | SF2 | SF3 |
|---|---|---|---|---|---|---|---|---|---|---|---|---|---|---|
| LDH | 1.0152 | 0.50 | 0.50 | -0.50 | -0.50 | -1.26 | -1.01 | 0.625 | 1.875 | 1.25 | 1.375 | 96.375 | 39 | 13.75 |
| AST | 1.0988 | -1.60 | -0.80 | -1.86 | -1.86 | -2.93 | -3.19 | 0 | 1.8519 | 1.0582 | 1.5873 | 12.963 | 5.5556 | 1.8519 |
| ALT | 1.0696 | -0.29 | -0.29 | -0.59 | -0.80 | -0.88 | -0.88 | 5.9172 | 11.834 | 10.947 | 10.947 | 36.391 | 77.219 | 55.917 |
| ALP | 1.0075 | -2.37 | -1.18 | -2.37 | -1.18 | -3.79 | -2.06 | -0.9877 | -1.2346 | -2.2222 | -1.2346 | 45.926 | 40.247 | -2.2222 |
| GGTP | 1.0124 | -0.80 | 0.00 | -1.20 | -2.40 | -3.60 | -2.84 | -0.4082 | 1.6327 | 1.2245 | 2.0408 | 60 | 25.306 | 4.898 |
| LAP | | 0.00 | 1.35 | -1.35 | 1.35 | -2.70 | -3.60 | -2.8571 | -2.8571 | -5.7143 | -2.8571 | 54.286 | 17.143 | 0 |
| CK | 0.9286 | -1.91 | 2.42 | 2.17 | 2.17 | -10.32 | -9.43 | -1.7654 | -1.261 | -2.7743 | -1.6393 | 99.748 | 53.504 | 0.8827 |
| CK-MB | 1.0227 | -13.64 | -11.36 | -4.55 | -4.55 | -13.64 | -13.64 | 2.2222 | -2.2222 | -2.2222 | 2.2222 | 95.556 | 66.667 | 2.2222 |
| AMY | 1.0058 | -2.60 | 2.21 | -2.12 | -2.12 | -3.37 | -2.89 | 0 | 2.0192 | 1.5385 | 2.3077 | 22.115 | 9.3269 | 1.9231 |
| P-AMY | 1.1206 | -3.14 | -2.75 | -2.94 | -2.75 | -3.33 | -3.33 | 0.7828 | 2.7397 | 2.544 | 3.5225 | -18.982 | 5.2838 | -1.9569 |
| CHE | 1.0068 | 3.38 | 3.04 | 1.69 | 1.18 | 0.68 | 0.84 | 2.8523 | 4.3624 | 3.6913 | 3.6913 | 72.315 | 6.7114 | 3.1879 |
| PL | 1.0224 | -0.48 | -1.69 | 2.17 | -2.66 | -3.86 | -2.66 | | 1.4599 | 1.2165 | 2.1898 | 0.7299 | 1.9465 | -0.2433 |
| T-CHO | 1.0828 | -2.81 | -2.53 | -2.81 | -1.97 | -2.81 | -3.65 | -0.5666 | 1.4164 | 1.4164 | 2.5496 | -0.5666 | 0.2833 | -3.6827 |
| TG | 0.9792 | -2.08 | -3.13 | -3.13 | -2.43 | -4.86 | -4.51 | 0 | 1.773 | 2.1277 | 3.1915 | 0 | 1.4184 | -6.383 |
| HDL-C | 0.9286 | -7.34 | -6.42 | 0.92 | 2.75 | 0.92 | 2.75 | 1.9231 | -0.9615 | -3.8462 | -2.8846 | 9.6154 | 7.6923 | 89.423 |
| LDL-C | 0.9531 | -37.02 | -11.36 | -18.78 | -19.89 | -17.13 | -17.68 | 3.8251 | 7.6503 | 4.3716 | 2.1858 | 18.033 | 1.0929 | 88.525 |
| UN | 0.9956 | -2.16 | -1.82 | -1.47 | -1.64 | -2.51 | -1.82 | -0.8842 | 1.3263 | 0.4421 | 0.2653 | -0.7958 | 1.4147 | 0.8842 |
| UA | 1.0523 | -1.10 | -1.66 | -1.66 | -1.66 | -2.76 | -2.76 | -0.5525 | 2.2099 | 1.105 | 1.6575 | 4.4199 | 3.8674 | 1.105 |
| CRE | 1.003 | -1.75 | -1.65 | -1.75 | -1.75 | -1.86 | -2.58 | 0 | 2.2657 | 2.1627 | 2.1627 | 2.6777 | 7.621 | 1.3388 |
| GLU | 1.0522 | -1.53 | -1.36 | -1.87 | -1.87 | -2.72 | -2.89 | 0.8547 | 2.735 | 2.2222 | 2.906 | 1.1966 | 2.735 | 2.5641 |
| IP | 1.0625 | -0.60 | -0.60 | -1.81 | -1.81 | -2.41 | -2.41 | 0.5882 | 2.3529 | 1.1765 | 2.3529 | 1.1765 | 2.3529 | 2.3529 |
| Ca | 1.0038 | -2.26 | -2.64 | -2.64 | -2.64 | -3.02 | -3.02 | 0 | 1.8727 | 1.1236 | 1.1236 | -0.7491 | 1.8727 | 1.8727 |
| Mg | | -2.78 | -2.78 | -1.39 | -2.78 | -2.78 | -2.78 | 0 | 2.6316 | 1.3158 | 2.6316 | 1.3158 | 1.3158 | 1.3158 |
| ZTT | | -25.49 | -25.00 | -24.02 | -25.49 | -25.49 | -24.02 | | | | | | | |
| TTT | | 795.71 | 769.29 | 912.14 | 898.57 | 115.71 | 115.71 | | | | | | | |
| T-BIL | 0.8549 | -7.18 | -7.46 | -9.12 | -8.98 | -13.95 | -13.81 | 0.8559 | 6.2767 | 3.709 | 4.4223 | 85.449 | 7.7033 | 3.281 |
| D-BIL | 0.671 | -4.87 | -6.03 | -4.64 | -5.34 | -10.67 | -9.28 | 1.2019 | 3.125 | 2.1635 | 2.4038 | 89.663 | 4.8077 | 2.4038 |
| TP | 1.058 | 0.00 | -1.39 | -2.08 | -1.39 | -2.78 | -3.47 | 1.3699 | 2.7397 | 2.7397 | -0.6849 | -0.6849 | 4.1096 | 1.3699 |
| ALB | 1.0233 | -4.44 | -4.44 | -4.44 | -4.44 | -6.67 | -6.67 | 0 | 2.2727 | 2.2727 | 4.5455 | -6.8182 | 0 | -2.2727 |
| CRP | 1.0488 | -9.53 | -9.51 | -12.86 | -13.49 | -14.53 | -14.64 | 5.7107 | 11.706 | 14.339 | 18.573 | 42.252 | 7.2051 | 0.0356 |
| Na | | -2.15 | -2.01 | -4.30 | -4.37 | -3.12 | -3.16 | 1.3661 | 3.347 | -1.0929 | 2.9713 | 2.1175 | 2.7322 | 2.2199 |
| K | | -3.89 | -3.96 | -6.92 | -6.53 | -5.13 | -5.36 | 1.4458 | 3.5341 | 2.5703 | 3.2129 | 2.3293 | 2.8112 | 1.8474 |
| Cl | | -10.38 | -7.77 | -3.99 | -4.28 | -3.82 | -3.78 | 1.2547 | 3.5132 | 2.3839 | 3.0949 | 2.3421 | 4.0987 | 3.0113 |

FIG. 3

LIQUID FOR EJECTION AND METHOD FOR EJECTING BIO-SPECIMEN

The entire disclosure of Japanese Patent Application No. 2009-153504, filed Jun. 29, 2009 is expressly incorporated by reference herein.

BACKGROUND

1. Technical Field

The present invention relates to liquid for ejection containing bio-specimen and methods for ejecting bio-specimen.

2. Related Art

For examining several ten types of biomolecules contained in blood, several ten cc of blood is necessary at present. In this connection, a detection technology that can substantially reduce the amount of blood required for examination is necessary.

As a method for accurately and efficiently dispensing a very small amount of liquid, it is possible to use the ink jet technology. For example, Japanese Laid-open Patent Application 2008-137987 (Patent Document 1) describes an example in which a solution containing at least one kind of protein and peptide is ejected by an inkjet method utilizing thermal energy.

Bio-specimens, such as, blood, contain many molecules, such as, protein molecules that would likely adhere nonspecifically to surfaces near ejection orifices and of flow paths of the ink jet head. Therefore, there are cases where those molecules, when adhered, clog the ejection orifices and the flow paths, incapacitating stable ejection. Also, as the ejected bio-specimen is subject to biochemical examination, the bioactivity of the contained biomolecules needs to be maintained. However, Patent Document 1 does not describe any concrete methods to address such an issue.

SUMMARY

In accordance with some aspects of the invention, there is provided a liquid for ejection containing bio-specimen, which does not lower the bioactivity of biomolecules contained, and is capable of stable ejection through very fine ejection orifices.

In accordance with an embodiment of the invention, a liquid for ejection includes a bio-specimen and at least one kind of first compounds expressed by Formula (1):

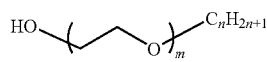

Formula (1)

wherein, in Formula (1), m≧8, and 8≦n≦18.

As a result, it becomes possible to prevent molecules of proteins and the like contained in the bio-specimen from adhering to surfaces near ejection orifices and surfaces of flow paths of an ink jet head which causes clogging of the ejection orifices and the flow paths, thereby securing stable ejection. Also, addition of these compounds in the bio-specimen does not lower the bioactivity of the biomolecules contained in the bio-specimen, whereby a high level of reproducibility of their biochemical reaction can be obtained.

The first compound may preferably be included by 1 weight % or more of the bio-specimen. As a result, sufficient ejection stability can be obtained even after a long time has elapsed since the liquid for ejection is filled in the ink jet head.

Also, in Formula (1), it is preferred that m≧12, and n=12. As a result, sufficient ejection stability can be obtained even after a long time has elapsed since the liquid for ejection is filled in the ink jet head.

In accordance with an embodiment of the invention, a liquid for ejection includes a bio-specimen and at least one kind of seconds compounds expressed by Formula (2):

Formula (2)

wherein, in Formula (2), m≧10, and 4≦n≦10.

As a result, it becomes possible to prevent molecules of proteins and the like contained in the bio-specimen from adhering to surfaces near ejection orifices and surfaces of flow paths of an ink jet head which causes clogging of the ejection orifices and the flow paths, thereby securing stable ejection. Also, addition of these compounds in the bio-specimen does not lower the bioactivity of the biomolecules contained in the bio-specimen, whereby a high level of reproducibility of their biochemical reaction can be obtained.

The second compound may preferably be included by 1 weight % or more of the bio-specimen. As a result, sufficient ejection stability of an ink jet head can be obtained.

Also, in Formula (2), it is preferred that m≧12, and n=6. As a result, sufficient ejection stability of an ink jet head can be obtained.

The bio-specimen may preferably include blood serum. By this, the amount of blood sampling required for examination can be substantially reduced.

According to a method for ejecting a bio-specimen in accordance with an embodiment of the invention, at least one kind of first compounds expressed by Formula (1) is added to a bio-specimen, and the bio-specimen is ejected by using an ink jet method.

Formula (1)

wherein, in Formula (1), m≧8, and 8≦n≦18.

As a result, it becomes possible to prevent molecules of proteins and the like contained in the bio-specimen from adhering to surfaces near ejection orifices and surfaces of flow paths of an ink jet head which causes clogging of the ejection orifices and the flow paths, thereby securing stable ejection. Also, addition of these compounds in the bio-specimen does not lower the bioactivity of the biomolecules contained in the bio-specimen, whereby a high level of reproducibility of their biochemical reaction can be obtained.

According to a method for ejecting a bio-specimen in accordance with another embodiment of the invention, at least one kind of second compounds expressed by Formula (2) is added to a bio-specimen, and the bio-specimen is ejected by using an ink jet method.

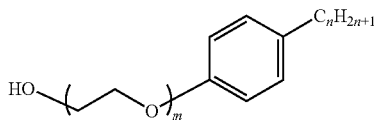

Formula (2)

wherein, in Formula (2), $m \geq 10$, and $4 \leq n \leq 10$.

As a result, it becomes possible to prevent molecules of proteins and the like contained in the bio-specimen from adhering to surfaces near ejection orifices and surfaces of flow paths of an ink jet head which causes clogging of the ejection orifices and the flow paths, thereby securing stable ejection. Also, addition of these compounds in the bio-specimen does not lower the bio-activity of the biomolecules contained in the bio-specimen, whereby a high level of reproducibility of their biochemical reaction can be obtained.

BRIEF DESCRIPTION OF THE DRAWINGS

FIG. 1 is a table showing evaluation results obtained for liquid for ejection in accordance with an embodiment of the invention, in which changes in their ejection stability with elapsed time are evaluated.

FIG. 3 is a table showing results of measurement of the biochemical reactivity of blood serum protein molecules contained in liquid for ejection in accordance with the embodiment of the invention.

DESCRIPTION OF EXEMPLARY EMBODIMENTS

Figure 2:
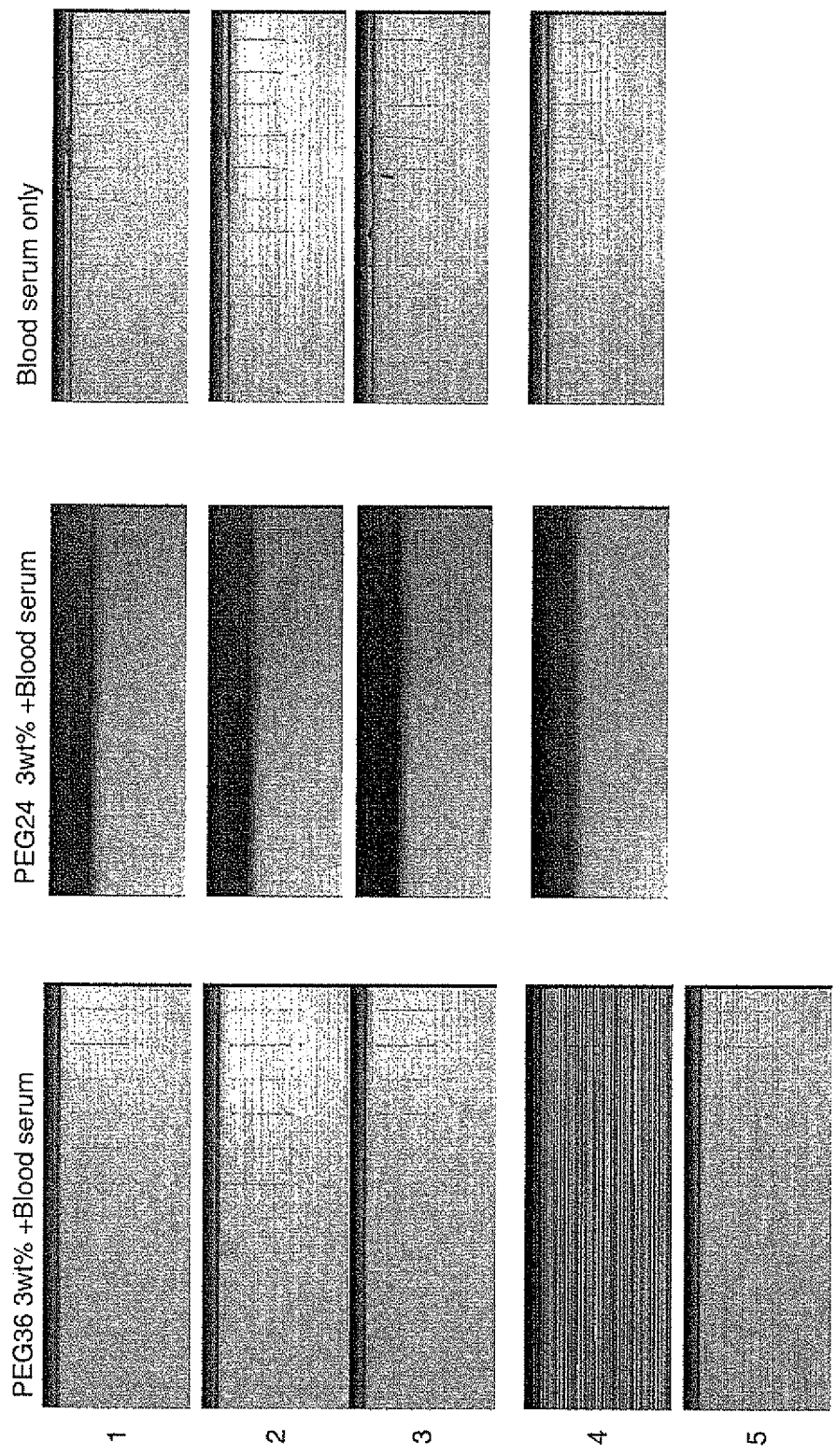
FIG. 2 shows photographs capturing the moments when liquid for ejection in accordance with the embodiment of the invention is ejected from ejection orifices.

Preferred embodiments of the invention are described below. Liquid for ejection in accordance with an embodiment of the invention may be obtained by adding a compound in a bio-specimen. The compound to be added is a first compound expressed by Formula (1) below, or a second compound expressed by Formula (2) below. The first and second compounds are straight-chain alkyl surfactant including ethylene glycol chain.

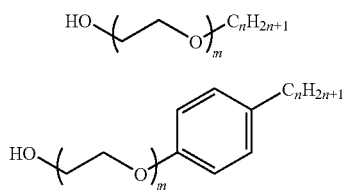

Formula (1)

Formula (2)

The bio-specimen may be blood, blood serum or the like. Here, human blood serum sample CRPII (in which C-reactive protein is added in human blood serum to a predetermined level of concentration) is used.

The first compounds are surfactant molecules including ethylene glycol chain (chain length m) and alkyl chain (chain length n). Here, $m \geq 8$, and $8 \leq n \leq 18$.

The second compounds are surfactant molecules including ethylene glycol chain (chain length m) and alkyl chain (chain length n). Here, $m \geq 10$, and $4 \leq n \leq 10$.

Table 1 below shows examples of the first and second compounds.

TABLE 1

| Name of Compound | Supply Source | Molecular Structure of Compound |
|---|---|---|
| PEG12 | Polypure | n = 12, m = 12 in Formula (1) |
| PEG24 | Polypure | n = 12, m = 24 in Formula (1) |
| PEG36 | Polypure | n = 12, m = 36 in Formula (1) |
| P1777 | Tokyo Chemical Industry Co., Ltd. | n = 12, $8 \leq 5$ m $\leq 36$ in Formula (1) |
| PEG-B-24 | Polypure | n = 6, m = 24 in Formula (2) |

Examples of a method of synthesizing PEG36 among the first compounds are described.

1) Synthesis of Dibenzyl-PEG36

As shown in Formula (3), dimethylate PEG 12 (7) and mono-benzyl PEG12 (8) are reacted in the presence of bases (pH=12), thereby synthesizing dibenzyl-PEG36 (9).

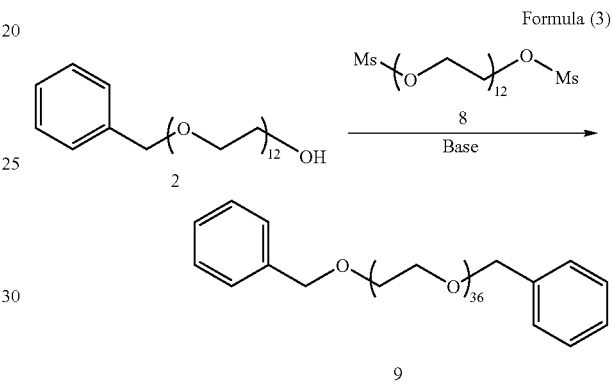

Formula (3)

2) Synthesis of Monobenzyl-PEG36

As shown in Formula (4), dibenzyl-PEG36 (9) is dissociated by hydrogenation reduction with palladium-carbon catalysis, and is further subject to heat reflux in a methanol solvent. Upon confirming that dibenzyl-PEG36 is completely disappeared from the reaction mixed solution by HPLC (High Performance Liquid Chromatography) or the like, the reaction product is purified and separated by column chromatography, thereby obtaining monobenzyl-PEG36 (10).

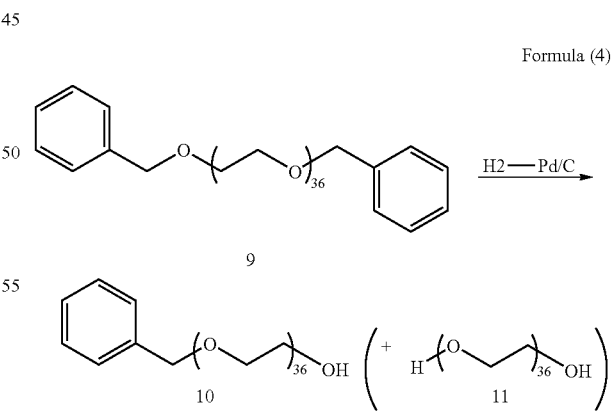

Formula (4)

3) Synthesis of Benzyl-PEG36-Dodecane and PEG36-Dodecyl Ether (Formula (5))

Mono-benzyl-PEG36 (10) is dissolved in trifluorotoluene (TFT), and dodecyl bromide and potassium tert-butoxide (tert-BuOK) are dissolved therein, which is then subject to heat reflux. After completing the reaction, extraction and purification are conducted, thereby obtaining benzyl-PEG36-dodecane (12). Thereafter, benzyl-PEG36-dodecane (12) is dissolved in methanol, and is dissociated by hydrogenation reduction with palladium-carbon catalysis. After completing the reaction, the reaction product is extracted and purified by column chromatography, thereby obtaining white powder-like PEG36-dodecyl ether (13).

adhered, clog the ejection orifices and the flow paths. Also, as the time elapses, the blood serum liquid may dry and coagulate, which may cause clogging of the ejection orifices and the flow paths.

Among the compounds added, P200, P400 and P11000 (which are all supplied from Nippon Oil & Fats Co., Ltd.) are polyethylene glycol with the mean molecule weight being

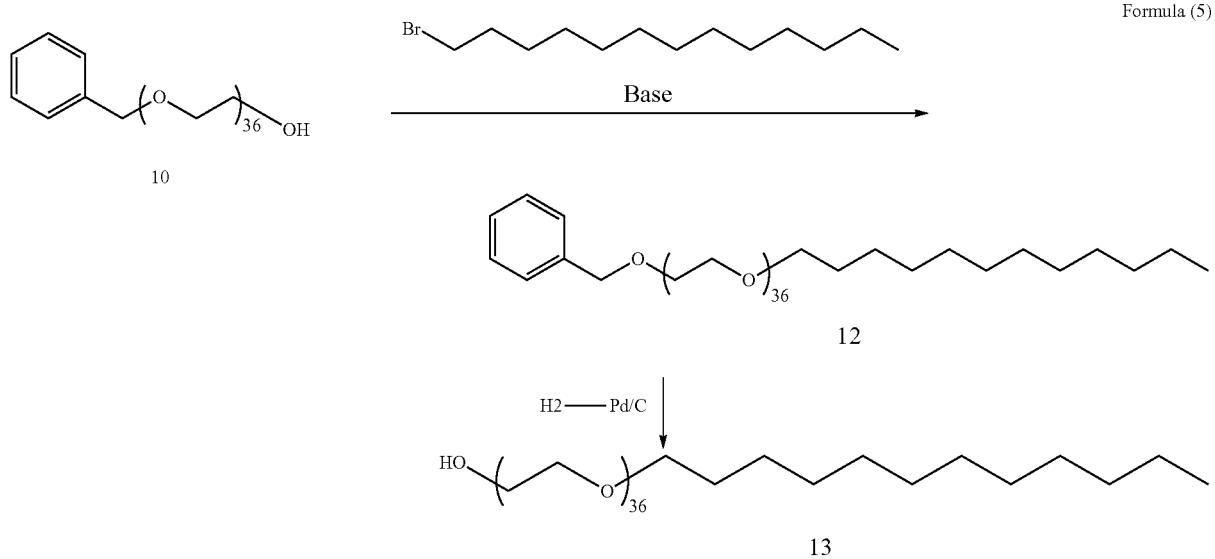

Formula (5)

Next, a method of manufacturing the liquid for ejection is described. Here, the method is described using an example in which blood serum is used as the bio-specimen. First, blood sampled from a person to be examined is set on a centrifugal separator, thereby separating blood serum liquid that is the supernatant fluid.

Then, the first compound or the second compound described above is added in 10 ml of the separated blood serum, and is dissolved in the blood serum with as little shaking as possible. The addition amount of the compound is desirably 1 weight % of the blood serum or higher. The compound is dissolved at room temperature. Alternatively, the compound may be dissolved, while lightly shaking a container containing them dipped in warmed water at 35° C. By this, the dissolving rate can be increased. After dissolving, the separated and precipitated insoluble substance is removed, and the solution is stored for half a day at 5° C.

Next, the liquid for ejection in accordance with the present embodiment was filled in ink jet heads, and changes in their ejection stability with elapsed time were evaluated, while changing the elapsed time from charging the liquid for ejection until discharging the same. FIG. 1 shows the evaluation results.

FIG. 1 is a table showing the results of evaluation of the ejection stability, obtained by changing the kind and amount (weight %) of the compound added and the elapsed time from filling the liquid for ejection until its ejection. The table in FIG. 1 shows how many of 12 nozzles stably ejected the liquid. For example, when 10 nozzles among the 12 nozzles performed stable ejection, this is expressed as (10/12).

Blood serum contains many molecules, such as, protein molecules that would likely adhere nonspecifically to surfaces near ejection orifices and flow paths of the ink jet head. Therefore, there are cases where those molecules, when 200, 400 and 11000, respectively. These polyethylene glycol acts to prevent the blood serum liquid from drying.

As shown in FIG. 1, when P200, P400 and P11000 were added, the result of 12/12 was obtained immediately after dissolving; but five seconds later, the result deteriorated to 3/12-0/12. This shows that the ejection would not be stabilized by mere addition of polyethylene glycol.

Looking at the first compound (PEG12, PEG24, PEG36, P1777) and the second compound (PEG-B-24), it is observed that those of the compounds having longer chain length of hydrophilic ethylene glycol contained in the molecules (compounds with greater m) maintain the ejection stability at high level even after a longer time has elapsed. As for the addition amount, the addition of 1 weight % or more is effective, but it is observed that higher stability can be obtained when the addition amount is 3 weight % or higher.

FIG. 2 shows photographs capturing the moments when liquid for ejection is ejected from ejection orifices. Three kinds of liquid, i.e., blood serum with PEG36 added by 3 weight %, blood serum with PEG24 added by 3 weight %, and blood serum alone, were prepared. FIG. 2 shows the states of four or five samples in which the liquid for ejection was ejected 60 seconds later after the liquid was filled in ink jet heads. As shown in the figure, each of the photographs shows liquid ejected from 12 nozzles. In the case of blood serum alone, it is observed that many of the trajectories of the ejected liquid are curved. This is because molecules such as protein molecules in the blood serum adhered nonspecifically to surfaces near the ejection orifices and surfaces of the flow paths, whereby the ejection directions of the droplets were changed. In this manner, when flight curving of droplets occurs, the amount of liquid to be ejected cannot be correctly controlled, such that the liquid for ejection cannot be correctly dispensed.

On the other hand, in the case of the blood serum with PEG36 added by 3 weight % and the blood serum with PEG24 added by 3 weight %, nonspecific adhesion of molecules such as protein molecules can be prevented, such that flight curving of droplets does not occur, and therefore smooth and stable ejection becomes possible. Therefore, correct dispense of the liquid for ejection can be made possible.

Next, changes in the biochemical reactivity of biomolecules contained in the liquid for ejection in accordance with the present embodiment were evaluated, and FIG. 3 shows the evaluation results.

FIG. 3 is a table showing results of measurement of the biochemical reactivity of various blood serum protein molecules. The table in FIG. 3 shows differences (%) from a reference value that measures the bioactivity of blood serum alone, for the liquids in which PEG12, PEG24, PEG36, P1777, SF1, SF2, SF3 are dissolved in blood serum, respectively. Those having differences of ±5% or greater are shown in bold type. In the case of PEG36, the measurement was conducted with its concentration changed from 1 weight % to 4 weight %. In the cases of PEG12, PEG24 and P1777, their concentration was set to 3 weight %. For the liquids with PEG12, PEG24 and P1777, the results obtained by directly measuring the solutions (dissolving), and the results obtained by measuring the liquid ejected by the ink jet heads (head dispensing) are shown. It is noted that the liquids with SF1, SF2 and SF3, and the liquid with PEG36 added by 1 weight % and 2 weight % did not provide stable ejection, and dispense by the inkjet heads could not be performed.

SF1 and SF2 (supplied from Polypure) are compounds expressed by Formula (6) below. In Formula (6), n=12 in SF1, and n=24 in SF2.

Formula (6)

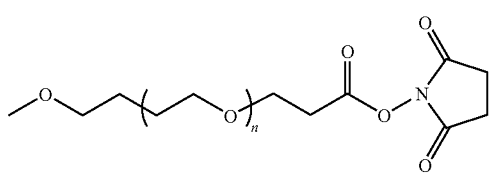

SF3 (supplied from Tokyo Chemical Industry Co., Ltd.) is compound expressed by Formula (7) below. In Formula (7), n=12.

Formula (7)

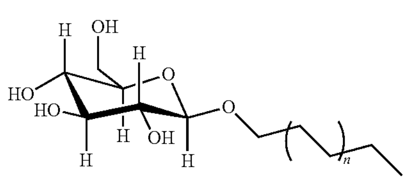

As shown in FIG. 3, in the cases of PEG12, PEG24, PEG36, P1777, it is observed that those of the compounds having longer chain length of hydrophilic ethylene glycol contained in the molecules (compounds with greater m) are more effective in maintaining the bioactivity of proteins in the blood serum. In particular, when PEG36 is added by 3 weight % or more, high reproducibility of the biochemical reaction was observed except some of the proteins such as ALT and CRP.

As described above, according to the liquid for ejection in accordance with the present embodiment, the first compound expressed by Formula (1) or the second compound expressed by Formula (2) is added in blood serum or the like by 1 weight % or more, whereby it becomes possible to prevent proteins contained in the blood serum from adhering to surfaces near the ejection orifices and surfaces of the flow paths of ink jet heads which causes clogging of the ejection orifices and the flow paths, thereby securing stable ejection.

Also, addition of these compounds in blood serum does not lower the bioactivity of the biomolecules contained in the blood serum, whereby a high level of reproducibility of their biochemical reaction can be obtained, except some proteins.

Also, those of the first compounds and the second compounds having longer chain length of hydrophilic ethylene glycol contained in their molecules (with greater m) maintain the ejection stability at high level even after a longer time elapses. Also, the addition of 1 weight % or more is effective, but higher stability can be obtained when the addition amount is 3 weight % or higher.

What is claimed is:

1. A liquid for ejection comprising:

a bio-specimen that includes blood serum; and at least one kind of first compounds expressed by Formula (1), Formula (1)

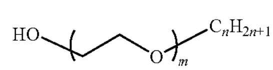

wherein:

in Formula (1), $m \geqq 12$ and n=12, and the liquid includes the at least one kind of first compounds expressed by Formula (1) ranging from 2 to 4 weight %.

2. A liquid for ejection according to claim 1, wherein the blood serum includes a plurality of proteins having bioactivity, wherein the bioactivity of the plurality of proteins is maintained in the liquid for ejection.

3. A liquid for ejection according to claim 2, wherein the plurality of proteins includes at least one protein selected from the group consisting of C-Reactive Protein (CRP), Albumin (Alb), Lactate Dehydrogenase (LDH), Amylase (Amy), Creatinine (Cre), or a combination thereof.

4. A liquid for ejection according to claim 1, wherein the liquid includes only one compound expressed by Formula (1).

* * * * *